United States Patent
Han et al.

(10) Patent No.: US 10,383,497 B2
(45) Date of Patent: Aug. 20, 2019

(54) ROBOT AND CONTROLLING METHOD THEREOF

(71) Applicant: SAMSUNG ELECTRONICS CO., LTD., Suwon-si (KR)

(72) Inventors: Seung-beom Han, Suwon-si (KR); Myung-sik Kim, Suwon-si (KR); Jong-hoon Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 128 days.

(21) Appl. No.: 15/097,358

(22) Filed: Apr. 13, 2016

(65) Prior Publication Data

US 2016/0334800 A1 Nov. 17, 2016

Related U.S. Application Data

(60) Provisional application No. 62/160,112, filed on May 12, 2015.

(30) Foreign Application Priority Data

Oct. 8, 2015 (KR) ........................ 10-2015-0141739

(51) Int. Cl.
*A47L 11/40* (2006.01)
*G05D 1/02* (2006.01)

(52) U.S. Cl.
CPC ........ *A47L 11/4011* (2013.01); *G05D 1/0274* (2013.01); *A47L 2201/06* (2013.01); *G05D 2201/0203* (2013.01)

(58) Field of Classification Search
CPC ......... G05D 1/0274; G05D 2201/0203; G05D 1/028; G05D 1/0225; G05D 2201/0215;
(Continued)

(56) References Cited

U.S. PATENT DOCUMENTS 8,744,665 B2 6/2014 Shin et al.
9,058,039 B2 6/2015 Lee et al.
(Continued)

FOREIGN PATENT DOCUMENTS

KR  10-2006-0072597 A  6/2006
KR  10-2007-0027840 A  3/2007
(Continued)

OTHER PUBLICATIONS

Search Report dated Jun. 30, 2016, issued by the International Searching Authority in counterpart International Application No. PCT/KR2016/002698 (PCT/ISA/210).
(Continued)

*Primary Examiner* — Stephen Holwerda
(74) *Attorney, Agent, or Firm* — Sughrue Mion, PLLC

(57) ABSTRACT

A robot and a controlling method thereof are provided. The robot includes a driver unit configured to move a location of the robot, a sensor unit configured to sense an environment around the robot, and a controller configured to, in response to the location of the robot being changed by a user, check a current location of the robot by using the environment of the changed location sensed by the sensor unit and pre-stored map information, determine a task to be performed, based on the checked location and the environment of the changed location, and control the driver unit according to the determined task.

32 Claims, 17 Drawing Sheets

(58) Field of Classification Search
CPC . G05D 1/0242; G05D 1/0022; A47L 11/4011;
A47L 2201/06; A47L 2201/04
See application file for complete search history.

(56) References Cited

U.S. PATENT DOCUMENTS

| | | | |
|---|---|---|---|
| 2003/0030398 A1* | 2/2003 | Jacobs | G05D 1/0274 318/568.12 |
| 2005/0022273 A1* | 1/2005 | Maeki | G05D 1/0274 701/300 |
| 2006/0025887 A1* | 2/2006 | Park | G05D 1/0242 700/245 |
| 2007/0118248 A1 | 5/2007 | Lee et al. | |
| 2007/0150094 A1* | 6/2007 | Huang | G05D 1/0274 700/245 |
| 2008/0206092 A1* | 8/2008 | Crapser | A47L 11/24 422/5 |
| 2011/0004342 A1* | 1/2011 | Knopow | A47L 5/28 700/253 |
| 2012/0259481 A1 | 10/2012 | Kim | |
| 2014/0031980 A1 | 1/2014 | Gutmann et al. | |
| 2014/0180525 A1 | 6/2014 | Tsuboi | |
| 2014/0230179 A1 | 8/2014 | Matsubara et al. | |

FOREIGN PATENT DOCUMENTS

| | | |
|---|---|---|
| KR | 10-0728225 B1 | 6/2007 |
| KR | 10-0834761 B1 | 6/2008 |
| KR | 10-2011-0053760 A | 5/2011 |
| KR | 10-1038702 B1 | 6/2011 |
| KR | 10-2013-0000278 A | 1/2013 |
| WO | 2013/071190 A1 | 5/2013 |
| WO | 2015/018437 A1 | 2/2015 |

OTHER PUBLICATIONS

Written Opinion dated Jun. 30, 2016, issued by the International Searching Authority in counterpart International Application No. PCT/KR2016/002698 (PCT/ISA/237).
Communication dated Apr. 4, 2018, issued by the European Patent Office in counterpart European application No. 16792833.2.
Office Action dated Nov. 21, 2018 by the European Patent Office in counterpart European Patent Application No. 16792833.2.

* cited by examiner

RETURN TO ORIGINAL LOCATION AND THEN
CONTINUOUSLY PERFORM CLEANING AFTER CLEANING

CONTINUOUSLY PERFORM CLEANING AFTER SETTING
ORIGINAL LOCATION TO INACCESSIBLE AREA

ROBOT AND CONTROLLING METHOD THEREOF

CROSS-REFERENCE TO RELATED APPLICATIONS

This application claims priority from Korean Patent Application No. 10-2015-0141739, filed on Oct. 8, 2015, in the Korean Intellectual Property Office, and U.S. Provisional No. 62/160,112, filed on May 12, 2015, in the United States Patent and Trademark Office, the disclosure of which is incorporated herein by reference in its entirety.

BACKGROUND

Field

Apparatuses and methods consistent with the exemplary embodiments relate to a robot and a controlling method thereof, and more particularly, to a robot that checks an intention of a user to provide a service in a forcible movement situation, and a controlling method thereof.

Description of the Related Art

The development of robot technologies has generalized supplies of robots in specialized academic fields, industry fields requiring a large-scale workforce, and general homes. A service robot providing housework services, a cleaning robot, a pet robot, etc. have been mainly supplied to users.

It is important for a robot to provide a user with a service to check a location of the robot and an intention of the user. According to an existing robot technology, if a location of a robot is forcibly moved, the moved location of the robot is not accurately determined, and a service that is being performed is initialized.

Also, if the user forcibly moves the location of the robot, an existing performed service proceeds in a changed location, and thus an intention of the user to move the location of the robot is not reflected. Therefore, the user feels uncomfortable with moving the robot and then resetting a desired service.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

The exemplary embodiments provide a robot that determines a current location thereof by using a map of an area where the robot provides a service and that provides a service appropriate for an intention of a user who forcibly moves the robot, by using changed location information and environment information, and a controlling method thereof.

According to an aspect of the exemplary embodiments, a robot includes a driver unit configured to move a location of the robot, a sensor unit configured to sense an environment around the robot, and a controller configured to, in response to a location of the robot being changed by the user, check a current location of the robot by using an environment of the changed location sensed by the sensor unit and pre-stored map information, determine a task to be performed, based on the checked location and the environment of the changed location, and control the driver unit according to the determined task.

The map information may store a plurality of divided areas and task information set in each of the plurality of divided areas.

In response to the location of the robot being changed by the user in response to a preset task being performed, the controller may determine a priority order between a task performed in the changed location and the task that is being performed and performs the tasks according to the determined priority order.

The controller may acquire a user location and time information and determines a task to be performed, additionally in consideration of the acquired user location and time information.

The robot may further include a dust collector configured to suck dust from a bottom surface of the robot. The sensor unit may include a dust sensor configured to sense a dust concentration around the robot.

The controller may compare the dust concentration sensed by the dust sensor with a dust concentration of an existing location to determine a location where cleaning is to be performed and control the dust collector and the driver unit to perform a cleaning task corresponding to the determined location.

The controller may determine a complexity level of the changed location and compare the determined complexity level with a complexity level of the existing location to determine a location where cleaning is to be performed.

The controller may reflect information about the determined complexity level on the pre-stored map information.

The sensor unit may include an odor sensor configured to sense a particular odor. The controller may search for a location corresponding to a source of the particular odor sensed by the odor sensor and set an area corresponding to the searched location to an inaccessible area.

The sensor unit may sense an environment around the robot by using an ultra-wideband (UWB) sensor.

In response to a task being completed, the controller may control the sensor unit to check a location of a charging station including a tag performing communications with the UWB sensor and control the driver unit to move into the checked location.

According to another aspect of the exemplary embodiments, a method of controlling a robot, includes, in response to a location of the robot being changed by a user, sensing an environment of the changed location, checking a current location of the robot by using the sensed environment of the changed location and pre-stored map information, and determining a task to be performed, based on the checked location and the environment of the changed location and performing the determined task.

The map information may store a plurality of divided areas and task information set in each of the plurality of divided areas.

The determining and performing of the task may further include, in response to the location of the robot being changed by the user in response to a preset task being performed, determining a priority order between a task performed in the changed location and the task that is being performed. The task may be performed according to the determined priority order.

The determining and performing of the task may further include acquiring a user location and time information. A task to be performed may be determined additionally in consideration of the acquired user location and time information.

The determining and performing of the task may include sensing a dust concentration around the robot, comparing the sensed dust concentration with a dust concentration of an existing location to determine a location where cleaning is to be performed, and performing a cleaning task corresponding to the determined location.

The determining and performing of the task may include determining a complexity level of the changed location, comparing the determined complexity level with a complexity level of the existing location to determine a location where cleaning is to be performed, and performing a cleaning task corresponding to the determined location.

The method may further include reflecting information about the determined complexity level on the pre-stored map information.

The method may further include, in response to a particular odor being sensed, searching for a location corresponding to a source of the sensed particular odor, and setting an area corresponding to the searched location to an inaccessible area.

In an exemplary embodiment, there is a robot including: a driver unit configured to move the robot; a sensor unit configured to sense an environment outside the robot; and a controller configured to, in response to a first location of the robot being changed by the user to a second location, determine the second location of the robot based on an environment of the second location sensed by the sensor unit and map information, determine a task to be performed, based on the second location and the environment of the second location, and control the driver unit based on the determined task.

In yet another exemplary embodiment, there is a method of controlling a robot, the method including: in response to a first location of the robot being changed by a user to a second location, sensing an environment of the second location; determine the second location of the robot by using the sensed environment of the second location and map information; and determining a task to be performed, based on the second location and the sensed environment of the second location and performing the determined task.

In one exemplary embodiment, there is an apparatus for cleaning, the apparatus including: means for moving the apparatus; a vacuum cleaning unit; a sensor configured to detect an environmental condition outside the apparatus; and a controller configured to control the means for moving the apparatus, the vacuum cleaning unit, and the sensor, operate the vacuum cleaning unit at a first location, in a first pre-defined task corresponding to the first location, determine a movement of the apparatus from the first location to a second location due to an external input, and, based on detected environmental condition outside the apparatus at the second location, operate the vacuum cleaning unit at the second location, in a second pre-defined task corresponding to the second location.

According to various exemplary embodiments as described above, if a location of a robot is changed by a user, the robot may check an intention of the user and provides an efficient service by using environment information, etc.

Additional and/or other aspects and advantages of the exemplary embodiments will be set forth in part in the description which follows and, in part, will be obvious from the description, or may be learned by practice of the same.

BRIEF DESCRIPTION OF THE DRAWING FIGURES

The above and/or other aspects of the exemplary embodiments will be more apparent by describing certain exemplary embodiments with reference to the accompanying drawings, in which.

DETAILED DESCRIPTION OF THE EXEMPLARY EMBODIMENTS

Figure 1:
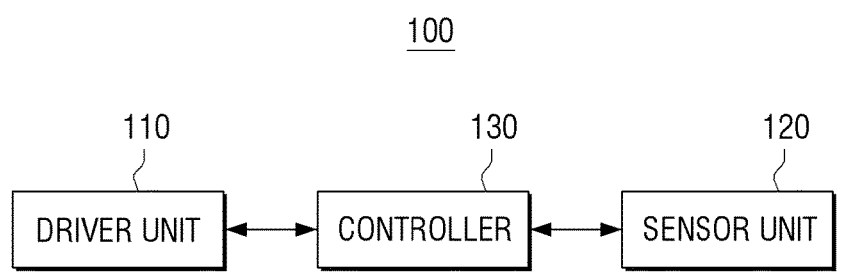
FIG. 1 is a block diagram of a schematic configuration of a robot according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail.

The terms "first", "second", etc. may be used to describe diverse components, but the components are not limited by the terms. The terms are only used to distinguish one component from the others. For example, a first element may be termed a second element, and, similarly, a second element may be termed a first element, without departing from the scope of example embodiments. As used herein, the term "and/or," includes any and all combinations of one or more of the associated listed items.

The terms used in the present application are only used to describe the exemplary embodiments, but are not intended to limit the scope of the disclosure. The singular expression also includes the plural meaning as long as it does not differently mean in the context. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

FIG. 1 is a block diagram of a schematic configuration of a robot 100 according to an exemplary embodiment. Referring to FIG. 1, the robot 100 may include a driver unit 110, a sensor unit 120, and a controller 130.

The robot 100 may be realized as various types of devices that perform tasks to provide services to users. For example, the robot 100 may be realized as various types such as a home service robot, a robot cleaner, an education robot, a robot pet, a medical robot, a guide robot, etc.

The driver unit 110 may drive the robot 100. For example, the driver 110 may move the robot 100 into a location where a task is to be performed under control of the controller 130. In this case, the driver unit 100 may include at least one pair of wheels that contact a floor surface, a motor that supplies power to the wheels, and a driver that controls the motor. As another example, the driver unit 110 may realize an operation of performing a task. If a task is to move an object, the driver unit 110 may include a motor for performing an operation or the like of picking the object up. The driver unit 110 is not necessarily limited to the above-described embodiment, but in other exemplary embodiments, the driver unit 110 includes other mechanisms to move the robot 100, including a caterpillar track and/or propeller-based mechanisms for aerial movement.

The sensor unit 120 may sense, e.g., detect, an environment around, e.g., outside, the robot 100. In an exemplary embodiment, the sensor unit 120 may be a sensor which detects one or more environmental conditions outside the robot 100. The sensor unit 120 may sense a state of the robot 100. For example, the sensor unit 120 my sense a current location of the robot 100. Also, the sensor unit 120 may sense a pollution level, a complexity level, etc. around or outside the robot 100. To perform various operations as described above, the sensor unit 120 may include various types of sensors. A detailed configuration of the sensor unit 120 will be described later with reference to FIG. 2. In an exemplary embodiment the complexity level of an area around the robot 100 may be determined for an entire area surrounding the robot 100. In another exemplary embodiment, the complexity level of an area outside the robot may be determined in one or more directions extending outwardly from the robot 100.

The controller 130 controls some or all elements of the robot 100. For example, if a user forcibly changes a location of the robot 100, e.g., from a first location to a second location, the controller 130 may check a current location of the robot 100 by using environment information sensed by the sensor unit 120 and pre-stored map information. In an exemplary embodiment, such a forcible change may be an example of a external input or force applied to the robot 100. The controller 130 may also determine a task that the robot 100 is to perform, based on the checked current location and the environment information. The controller 130 may control the driver 110, etc. to perform the determined task.

Examples of the forcible location change made by the user may include a movement of the robot 100 by picking up of the robot 100 by the user, a movement of the robot 100 by using a remote control device operated by the user, a user command for moving the robot 100 into a place where an ultra-wideband (UWB) tag is located, etc. In an exemplary embodiment, a forcible movement situation refers to an unplanned movement of the robot 100 that is not a movement of the robot 100 that is being performed in a task performance process of the robot 100. A term "kidnap" may also be used instead of the forcible movement situation. In another exemplary embodiment, the forcible location change may be made by overriding a current movement of the robot or by overriding an execution of a command by the robot.

Map information used in an exemplary embodiment may be map information that is written by sensing a surrounding environment with a movement of the robot 100 and global map information that includes location information about a previous space where the robot 100 is to operate. If a global map is used, a problem of initializing map information may be solved although the robot 100 is forcibly moved when performing a task. The map information may include a plurality of divided areas and task information set in each of the divided areas. In an exemplary embodiment, there is one task information set in one of the divided areas. In another exemplary embodiment, there are multiple pieces of task information set in one of the divided areas.

According to an exemplary embodiment, if a user changes a location of the robot 100 when performing a first task, the controller 130 may determine a priority order between a second task that is to be performed in the changed location and the first task. In an exemplary embodiment, when the robot 100 is moved to the changed location, but before the determination of the priority order, the first task may continue to be performed or the performance of the first task may stop. The controller 130 may also perform tasks according to determined priority orders. For example, if a ranking of the second task is higher than the first task, the controller 130 may control other elements, such as the driver unit 110, etc., to perform the second task in a moved location. After the second task is completed, the controller 130 may control the driver unit 110, etc. to move or return the robot 100 to a location where the robot was located prior to the forced movement, so as to continue to perform the first task According to an exemplary embodiment, the controller 130 may determine a task that is to be performed, additionally in consideration of a user location, time information, etc. besides the location information and the environment information. As there are various types of information to be considered, the controller 130 may further accurately check an intention of the user.

Figure 2:
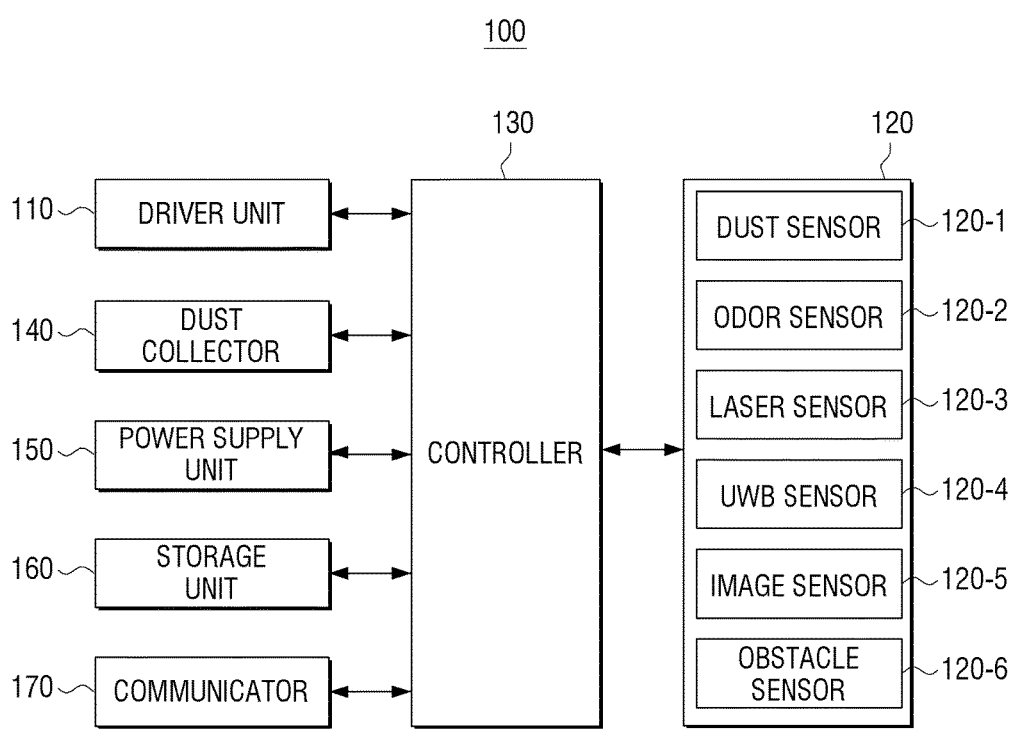
FIG. 2 is a block diagram of a detailed configuration of a robot according to an exemplary embodiment.

FIG. 2 is a block diagram of a detailed configuration of the robot 100, according to an exemplary embodiment. Referring to FIG. 2, the robot 100 may include the driver unit 110, the sensor unit 120, the controller 130, a dust collector 140, a power supply unit 150, a storage unit 160, a communicator 170, etc. However, elements of the robot 100 are not limited thereto. Some elements may be added according to types of tasks performed by the robot 100, and an element, such as the dust collector 140, may not be necessarily included.

The dust collector 140 collects dust. In detail, the dust collector 140 may suck in air and collect dust included in the sucked in air. For example, the dust collector 140 may include a motor that passes air through a guide pipe connected from an inlet to an outlet, a filter that filters dust in the sucked in air, a dust canister that holds the filtered dust, etc. In an exemplary embodiment, the dust collector 140 is an example of a cleaning unit. In an another exemplary embodiment, the dust collector 140 may be a vacuum cleaning unit.

The power supply unit 150 supplies power for driving the robot 100. For example, the power supply unit 150 may be realized as a battery that may be rechargeable or non-rechargeable. If residual power of the robot 100 drops to be lower than or equal to a preset level or a task is completed, the controller 130 may control the driver unit 110 to move the robot 100 to a charging station. Contact type charging and non-contact type charging, e.g., inductive charging, may be used as a charging method of the power supply unit 150.

The storage unit 160 may store map information. Besides this, the storage unit 160 may store various types of sensing information sensed by the sensor unit 120. The storage unit 160 may be a storage medium that stores various types of programs, etc. necessary for operating the robot 100 and may be realized as a memory, a hard disk drive (HDD), a solid state drive (SSD), a memory module of various configuration, a removable memory card or device, or the like, or as a combination thereof. For example, the storage unit 160 may include a read only memory (ROM) that stores a program for performing an operation of the robot 100, a random access memory (RAM) that temporarily stores data acquired according to the performance of the operation of the robot 100, etc. The storage unit 160 may further include an electrically erasable and programmable ROM (EE-PROM) that stores various types of reference data, etc.

The communicator 170 may transmit and receive data, a control command, etc. with an external apparatus. For example, the communicator 170 may receive global map information including location information about a space or a location where the robot 100 is to operate, from the external apparatus. The communicator 170 may also transmit and receive information for updating the global map information to the external apparatus. As another example, the communicator 170 may receive a signal for controlling the robot 100, wherein the signal is transmitted by the user by using a remote control device. The remote control device may be realized as various types such as a remote controller, a mobile device, an application or an app on a computer, etc. The communicator 170 may use various methods, such as a near field communication (NFC), a wireless local area network (WLAN), an InfraRed (IR) communication, a Zigbee communication, WiFi, BLUETOOTH®, etc., as a wireless communication method.

The sensor unit 120 may include various types of sensors. Referring to FIG. 2, the sensor unit 120 may include a dust sensor 120-1, an odor sensor 120-2, a laser sensor 120-3, an ultra wideband (UWB) sensor 120-4, an image sensor 120-5, an obstacle sensor 120-6, etc. Sensors constituting the sensor unit 120 are not limited to sensors illustrated in FIG. 2. The sensor unit 120 may further include various types of sensors that are not illustrated, and some of illustrated sensors may not be included according to tasks that are to be performed by the robot 100.

The dust sensor 120-1 may sense a dust concentration around or outside the robot 100. For example, the dust sensor 120-1 may sense a concentration of dust sucked in by the dust collector 140. For example, the dust sensor 120-1 may sense a dust concentration by using light scattered by dust particles.

The odor sensor 120-2 may sense a particular odor. For example, the odor sensor 120-2 may sense a pollutant such as an excretion of a pet or the like. The odor sensor 120-2 may sense a particular odor through a change in an electric resistance caused by a contact with an odor molecule.

The dust sensor 120-1 and the odor sensor 120-2 may be used to sense a pollution level of a surrounding environment of the robot 100, e.g., sense a pollution level of an environment outside of the robot 100.

The laser sensor 120-3 may sense a complexity level of the surrounding environment of the robot 100. For example, the laser sensor 120-3 may omnidirectionally emit a laser beam to sense whether an object exists around or outside the robot 100. If a piece of furniture such as a chair is disposed around or outside the robot 100, a complexity level may be evaluated as being high. If an object does not exist around or outside the robot 100, the complexity level may be evaluated as being low.

The UWB sensor 120-4 may measure a distance by using a time of flight taken for transmitting and receiving a radio wave. The UWB sensor 120-4 may measure the distance with a high accuracy by using a signal characteristic of a UWB. Also, a plurality of UWB sensors 120-4 may be disposed in the robot 100 to check a direction of a place where a UWB tag is located.

For example, if the UWB sensor 120-4 is used, the place where the UWB tag is located may be tracked. Therefore, although a location of a charging station where the UWB tag is installed is changed, the robot 100 may find and return to an accurate location of the charging station.

The image sensor 120-5 may capture an image of a periphery of the robot 100 to generate environment information. Also, an image of a ceiling may be captured by using the image sensor 120-5 to check a location of the robot 100. Objects located in an advancing direction of the robot 100, e.g., forward of the robot 100, may be captured by using the image sensor 120-5. For example, the image sensor 120-5 may be realized as a Charge Coupled Device (CCD) or a Complementary Metal Oxide Semiconductor (CMOS) device. The CCD is a device where Metal-Oxide Silicon (MOS) capacitors are very adjacent to one another, and charge carriers are stored in and transferred to the MOS capacitors. A CMOS image sensor is a device that uses a switching method of forming MOS transistors by the number of pixels by using a CMOS technology and sequentially detecting outputs by using the MOS transistors, wherein the CMOS technology uses a control circuit and a signal processing circuit as peripheral circuits.

The obstacle sensor 120-6 may sense an obstacle that disturbs a movement of the robot 100. For example, the obstacle sensor 120-6 may include a noncontact type sensor and a contact type clash and/or bumper sensor capable of identifying a wall, a gap, a pillar, a threshold, a bump, etc. through which the robot 100 may not pass.

Figure 3:
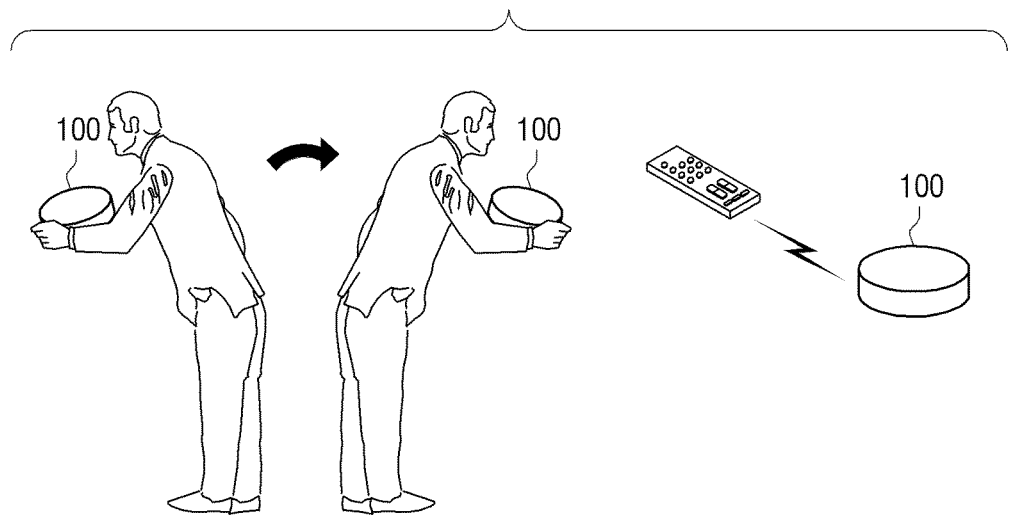
FIG. 3 illustrates a situation where a robot is forcibly moved, according to an exemplary embodiment.

If a forcible movement situation of the robot 100 occurs, the controller 130 may determine a current location of the robot 100 by using environment information of a changed location sensed by the sensor unit 120 and pre-stored map information. FIG. 3 illustrates a forcible movement situation according to an exemplary embodiment. For example, if a user holds or picks up the robot 100 to put the robot 100 into another location or the user moves the robot 100 through the use of a remote controller, the controller 130 may determine that the robot 100 is in a forcible movement situation. Also, if the sensor unit 120 senses that the robot 100 is removed from a floor surface, the controller 130 may perform an operation of determining a changed location.

Figure 4A:
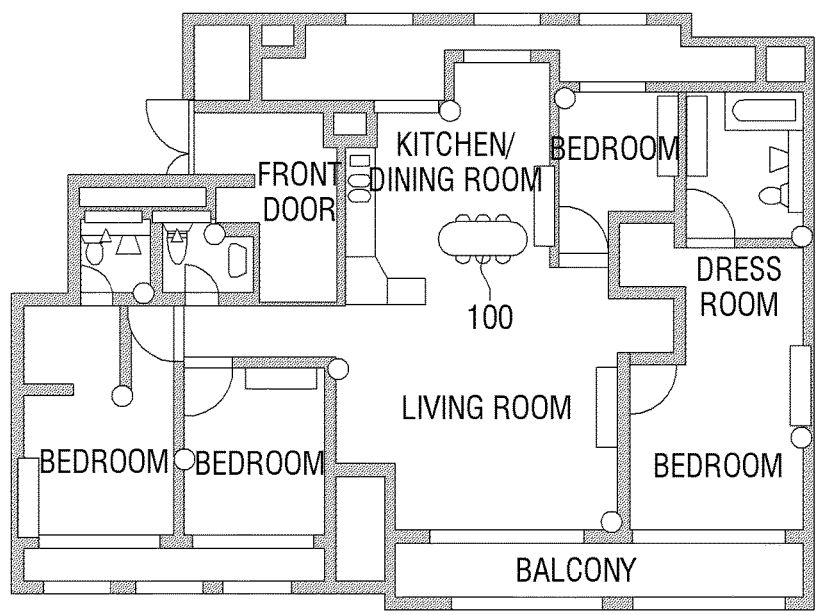
FIG. 4A illustrates a global map according to an exemplary embodiment.

FIG. 4A illustrates a global map that may be used in the robot 100, according to an exemplary embodiment. For example, the robot 100 that operates in a home may use a global map such as a plan view of an inside of the home.

The robot 100 may move to track a location thereof so as to generate and use a map of an internal space and may use a pre-stored global map so as not to initialize map information even in a situation where the location of the robot 100 is changed. Therefore, although a forcible movement situation is made by a user, the controller 130 may accurately check a location of the robot 100 before the robot 100 is moved and a task that is performed before the robot 100 is moved, to return to a previous task.

Figure 4B:
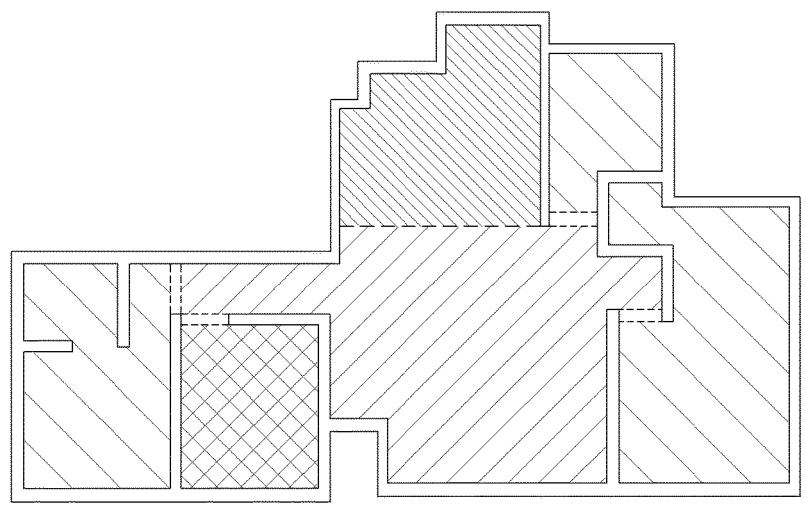
FIG. 4B illustrates a global map that is divided into a plurality of areas, according to an exemplary embodiment.

The map information may include a plurality of divided areas and task information set in each of the plurality of divided areas. For example, FIG. 4B illustrates the global map of FIG. 4A that is divided into a plurality of areas. An area into which the robot 100 may not move may be excluded from the global map. For example, as shown in FIG. 4B, areas such as a front door, a bathroom, etc. may be excluded from a map that is divided into areas.

The controller 130 may check an intention of the user who changes a location, e.g., moves the location of the robot, by using task information included in map information. For example, a kitchen and dining room area may include a dish-washing task, a food delivery task, etc. If the user moves a location of the robot 100 into the kitchen and dining room area, the controller 130 may determine that the robot 100 is located in the kitchen and dining room area, by using map information and sensed environment information. The controller 130 may also determine one of tasks preset in the kitchen and dining room area that is a checked location, as a task to be performed.

The controller 130 may acquire a user location and time information and additionally consider the user location and the time information to determine a task that is to be performed. For example, if a user who is located in a bedroom moves the robot 100 into the kitchen and dining room area during the morning hours, the controller 130 may determine a food delivery task as a task that is to be performed, based on a location of the user, time, and location information. As another example, if the user moves the robot 100 into the kitchen and dining room area at about 8 PM, the controller 130 may determine a dish-washing task as a task that is to be performed.

If a user changes a location of the robot 100 performing a preset task, the controller 130 may determine a priority order between a task at the changed location, e.g., a task corresponding to the changed location, and the preset task that was being performed. The controller 130 may also sequentially perform tasks according to determined priority orders.

For example, if a priority order of a task determined in a changed location is higher, the controller 130 may control the driver unit 110 to move the robot 100 into a previous location after performing the task determined in the changed location.

The controller 130 may also control the driver unit 110 to subsequently perform a task that is previously being performed.

On the contrary, if a priority order of a task that was performed in a location before changing the location is higher, the controller 130 may control the driver unit 110 to return to a previous location so as to first complete the task that was being performed.

As another example, the controller 130 may calculate a time required for a task determined in a changed location and a time required for a task that is previously performed, to determine a task that is to be first performed. If the robot 100 is to wait for 10 minutes after performing a first step of the task determined in the changed location, the controller 130 may control the driver unit 110 to return to a previous location so as to perform a task, which is previously performed, for 10 minutes that is a waiting time.

According to an exemplary embodiment, the robot 100 may further include the dust collector 140 that sucks in the dust of a floor surface. The robot 100 may be realized as a robot cleaner that includes elements for a cleaning task other than the dust collector 140. Hereinafter, an operation of the robot 100 for performing a cleaning task will be described with reference to FIGS. 5 through 7.

If wheels of the driver unit 110 are released from contacting the floor surface or the driver unit 110 receives a movement command through a remote controller or the like of the user, the controller 130 may determine that a forcible movement situation occurs. The controller 130 may also check a currently location of the robot 100 by using information sensed by the sensor unit 120 and pre-stored map information. For example, the controller 130 may check a current location and a previous location of the robot 100 by using the UWB sensor 120-4.

The controller 130 may compare a pollution level of a changed location and a pollution level of a previous location. A pollution level may be measured by using pieces of information sensed by the sensor unit 120. For example, the controller 130 may compare a dust concentration sensed by the dust sensor 120-1 and a dust concentration of an existing location to determine a location where cleaning is to be performed. According to another method, the controller 130 may determine a pollution level by using a reflectance of the floor surface sensed by the image sensor 120-5 or a light sensor (not shown). In this case, the controller 130 may control the sensor unit 120 to pre-measure the reflectance of the floor surface after completing cleaning and set the reflectance of the floor surface, which is measured after completing cleaning, to a reference value.

As another example, the controller 130 may control the sensor unit 120 to sense particular molecules in air and determine a pollution level based on the number of sensed molecules. The odor sensor 120-2 may generate an electrical signal through a contact with molecules causing a particular odor. The controller 130 may determine a pollution level by using the generated electrical signal (e.g., variations in an electrical resistance).

As another example, the controller 130 may control the sensor unit 120 to sense pollutants in air, a gas leak, a chemical leak, etc. The controller 130 may control the sensor unit 120 to measure an oxygen density in air and determine a pollution level based on the measured oxygen density. The controller 130 may control the sensor unit 120 to sense an oxygen concentration and a concentration of a particular chemical substance causing a sick house syndrome, such as toluene, methanol, or the like.

If a pollution level is higher than or equal to a preset level, the controller 130 may determine a current situation as a situation requiring a ventilation. If it is determined that a ventilation is required, the controller 130 may control the communicator 170 to transmit a control command for opening a window or operating a ventilator through a home network, Internet of Things (IoT), or the like. Alternatively, the controller 130 may generate a notification message for notifying a patient of a need for a ventilation. The controller 130 may control the robot 100 to output the notification message as a visual or auditory signal. Alternatively, the controller 130 may provide the user with the notification message through another device connected to a network, such as a mobile device of the user, a TV, or the like, IoT, or the like.

The controller 130 may change a pollution level measuring method according to a characteristic of an area by using a global map. For example, the controller 130 may control the sensor unit 120 to sense a gas concentration in air only in a kitchen area where there is a possibility of a gas leak, so as to measure a pollution level. As another example, if the robot 100 senses that a humidity is high at previous driving and thus is located in an area where humidity information is indicated on the global map, the controller 130 may sense whether mold appears on a wall surface, by using the image sensor 120-5 or the like. As described above, the controller 130 may perform a pollution level measurement appropriate for an area into which the user forcibly moves the robot 100, by using a pollution level of a floor surface in a normal cleaning task and a global map to determine an intention of the user who forcibly moves the robot 100.

Figure 5:
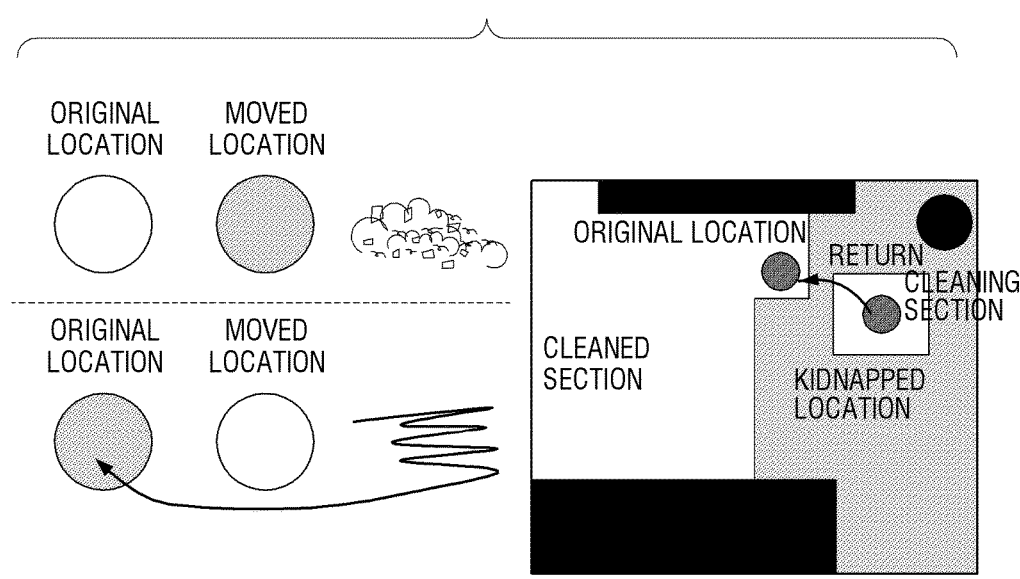
FIG. 5 illustrates an operation of a robot determining that a pollution level of a changed location is higher than a pollution level of an existing location, according to an exemplary embodiment.

FIG. 5 illustrates an operation performed if a pollution level of a changed location is higher. The user may change a location of the robot 100 with an intention of first cleaning a place having a high pollution level. For example, if it is determined that a pollution level of a changed location is high, the controller 130 may return to an existing location to perform a cleaning task after performing a cleaning task in the changed location.

Since the robot 100 according to an exemplary embodiment uses a global map, a progress of a cleaning task that is previously performed is not initialized. Therefore, since the robot 100 accurately knows a previous location, there does not occur a problem of repeatedly cleaning an area that is completely cleaned or skipping an area that is not cleaned.

If a pollution level of a changed location and a pollution level of a previous location are compared to determine that there is no increase in a pollution level, the controller 130 may determine a complexity level of the changed location. The controller 130 may also compare the determined complexity level with a complexity level of an existing location to determine a task that is to be performed.

If a surrounding environment is an environment that disturbs or impedes the driving of the robot 100, then such an environment is digitized to acquire a complexity level. For example, if an area where the robot 100 is located is wide enough for the robot 100 the pass through and there are no obstacles, the controller 130 may determine a complexity level as 0. On the contrary, if many obstacles are disposed around or near the robot 100, a passage is too narrow for the robot 100 to pass through, and the robot 100 is stuck in a preset area and is not able to stray or move out from the preset area, the controller 130 may determine a complexity level as a high value.

According to an exemplary embodiment, the controller 130 may estimate a complexity level caused by a building structure by using a global map. For example, the controller 130 my set an inaccessible section on the global map in consideration of a size of the robot 100 and a movement performance of the driver unit 110. As the global map is used, the controller 130 may determine whether a complexity level of a particular area is changeable (e.g., if a piece of furniture is temporarily disposed) or is unchangeable (e.g., if there is a narrow passage through which the robot 100 does not pass due to a building structure).

According to an exemplary embodiment, the controller 130 may measure a complexity level around or at a place where the robot 100 is located, by using various types of sensors included in the sensor unit 120. For example, the controller 130 may measure a complexity level by using the laser sensor 120-3. The laser sensor 120-3 may emit a laser beam in all directions around the robot 100 to sense whether an object exists around or outside of the robot 100. As another example, the controller 130 may measure a complexity level by using the obstacle sensor 120-6. The controller 130 may count the number of clashes sensed by a contact type clash and/or bumper sensor of the obstacle sensor 120-6 when passing through a preset area to measure a complexity level of the corresponding area. As another example, the controller 130 may determine an obstacle existing in a driving direction of the robot 100 by using the image sensor 120-5 or a camera (not shown). The controller 130 may measure a complexity level based on the number, sizes, etc. of determined obstacles. Here, the camera may not be disposed in the robot 100. The controller 130 may control the communicator 170 to receive an image captured by an external camera such as a closed-circuit television (CCTV) connected through IoT or a home network.

According to an exemplary embodiment, the controller 130 may determine a complexity level through a driving state of the robot 100. For example, if the robot 100 fails to drive for a preset time or more, the controller 130 may determine that a complexity level is high. As another example, if the robot 100 fails to stray or move out from a preset area even when continuously driving, the controller 130 may determine that a complexity level is high.

Figure 6:
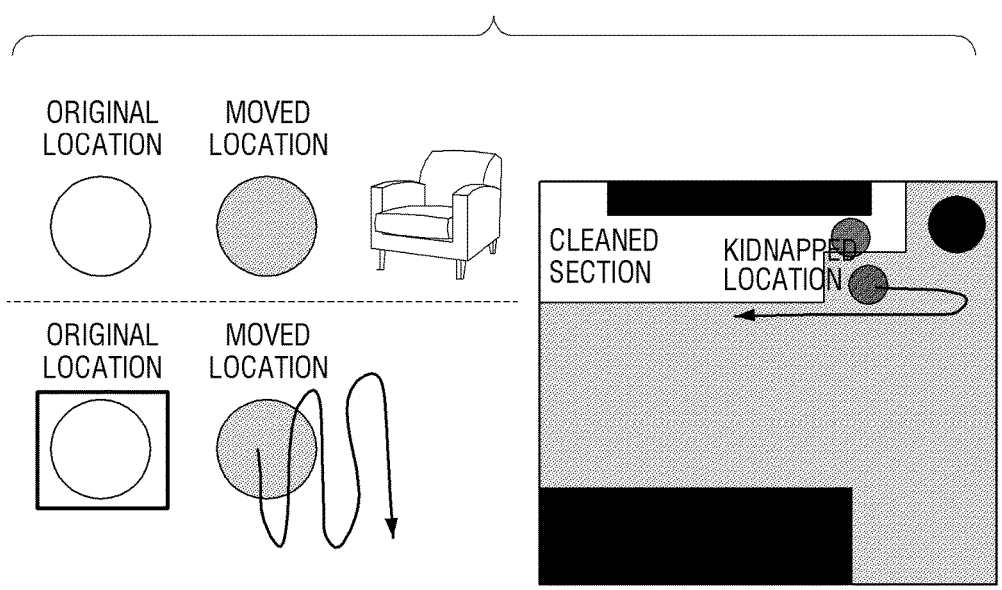
FIG. 6 illustrates an operation of a robot determining that a complexity level of a changed location is lower than a complexity level of an existing location, according to an exemplary embodiment.

FIG. 6 illustrates a pollution level of a changed location that has no great difference from a pollution level of a previous location and a complexity level that becomes lower than a complexity level of the previous location. For example, the user may move a piece of furniture that may disturb cleaning into a changed location. In this case, a complexity level of the moved location may be determined to be lower.

The controller 130 may determine a complexity level around or outside of the robot 100 by using the laser sensor 120-3 or the like. If a pollution level of a changed location is similar to a previous location, and a complexity level becomes lower than a complexity level of the previous location, the controller 130 may control the driver unit 110 and the dust collector 140 to perform a cleaning task in the changed location. The controller 130 may set an area corresponding to the previous location as an inaccessible area.

According to an exemplary embodiment, the controller 130 may set an area as the inaccessible area only when performing this time cleaning task. The controller 130 may determine that the inaccessible area is temporarily set and may not indicate the inaccessible area on a global map. However, the controller 130 may store a history of setting the inaccessible area in the storage unit 160. If a temporary inaccessible area is set repeatedly by the number of times in the same area for a preset period, the controller 130 may add or update information about the inaccessible area on the global map.

According to another exemplary embodiment, the controller 130 may immediately add or update information about a set inaccessible area on a global map. For example, the controller 130 may control the driver unit 110 not to access the inaccessible area, which is set when performing this time cleaning task, when performing next cleaning task. The controller 130 may also add or update location information of the inaccessible area and information about a complexity level, a pollution level, etc. of a corresponding area on a global map.

As another example, the controller 130 may control the driver unit 110 and the sensor unit 120 to access an inaccessible area, which is set when performing this time cleaning task, so as to measure a complexity level when performing a next cleaning task. Also, if there are changes in a complexity level in the inaccessible area, the controller 130 may update changed complexity level information on the global map. If a complexity level of the inaccessible area is lower than or equal to a preset level, the controller 130 may control the driver unit 110 and the dust collector 140 to release the inaccessible area and perform a cleaning task. On the contrary, if the complexity level of the inaccessible area is higher than or equal to the preset level or does not change, the controller 130 may control the driver unit 110 not to enter into the inaccessible area.

Also, the controller 130 may access the inaccessible area to measure a pollution level. A pollution level measuring method used in this case may be a method of using the image sensor 120-5 or the like that may perform a measurement at a long distance. If a pollution level of the inaccessible area is higher than or equal to a preset level, the controller 130 may provide the user with a notification message for notifying the user of a need for cleaning of the inaccessible area. The user may easily determine a need for cleaning a corresponding area, etc. through location information, complexity level information, pollution level information, and a notification message of the inaccessible area updated by the robot 100.

Figure 7:
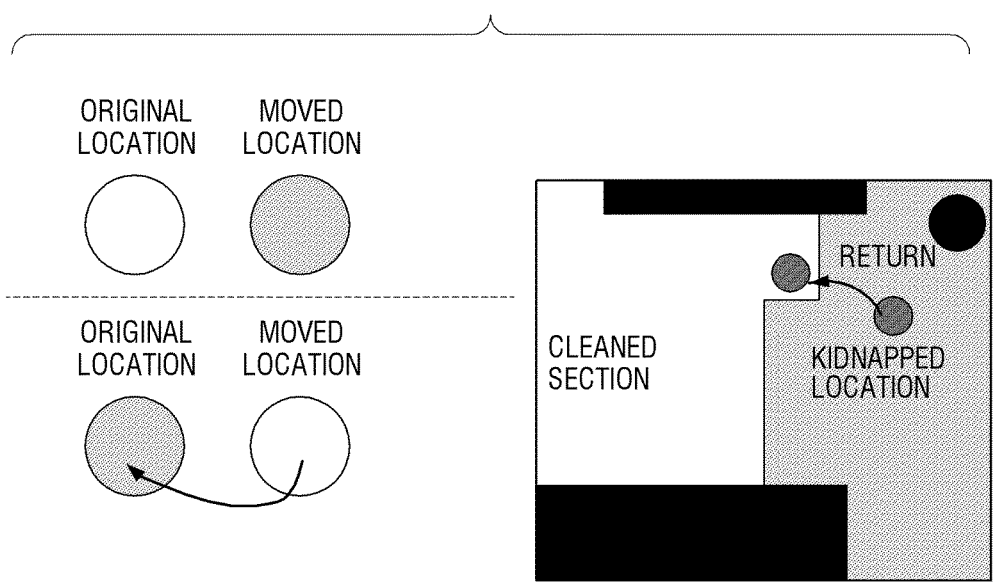
FIG. 7 illustrates an operation of a robot determining that pollution and complexity levels of a changed location are similar to pollution and complexity levels of an existing location, according to an exemplary embodiment.

As another example, as shown in FIG. 7, if a pollution level of a changed location does not become higher than a pollution level of a previous location, and a complexity level of the changed location does not become lower than a complexity level of the previous level, the controller 130 may control the driver unit 110 and the dust collector 140 to return to the previous location so as to sequentially perform a cleaning task. This case may be determined as a case where the user forcibly moves the robot 100 with an intention unrelated to a cleaning task such as when the robot 100 presents itself as an obstacle to a movement of the user.

According to an exemplary embodiment, the controller 130 may determine a complexity level with performing a task and add or update determined complexity level information on a pre-stored map information. Therefore, the controller 130 may indicate changes in an internal environment, such as a change in a furniture arrangement, etc., on a global map. For example, existing checked complexity level information may be stored in the map information together. If the determined complexity level information is different from the existing checked complexity level information, the controller 130 may perform a task by using currently determined complexity level information.

If an environment is temporarily changed, it may be inefficient to update the complexity level information every time. Therefore, if the determined complexity level information (e.g. second complexity level information) is different from the existing checked complexity level information (e.g., first complexity level information), the controller 130 may store the currently determined complexity level information (e.g., the second complexity level information) in the storage unit 160. Thereafter, the controller 130 may perform a task, pass through a corresponding location, and re-determine complexity level information (e.g., third complexity level information). The controller 130 may respectively compare the third complexity level information with the first complexity level information and the second complexity level information. If the third complexity level information corresponds to the first complexity level information, the controller 130 may determine that a temporary environment change occurs and delete the second complexity level information stored in the storage unit 160. On the contrary, if the third complexity level information corresponds to the second complexity level information, the controller 130 may determine that an actual internal environment change occurs to add or update changed complexity level information (second and third complexity level information) on a global map.

According to an exemplary embodiment, the controller 130 may search for a location corresponding to a source of an odor sensed by the odor sensor 120-2. The controller 130 may also set an area corresponding to the searched location to an inaccessible area.

For example, if filth, such as excretion of a pet dog, exists on a moving path of the robot 100, the robot 100 may move and thus spread the filth in an indoor space. In order to prevent this, if the odor sensor 120-2 senses a particular odor, the controller 130 may set an area corresponding to a source of the particular odor to an inaccessible area. In addition, the controller 130 may output a notification message for notifying the user of setting of the inaccessible area.

Figure 8:
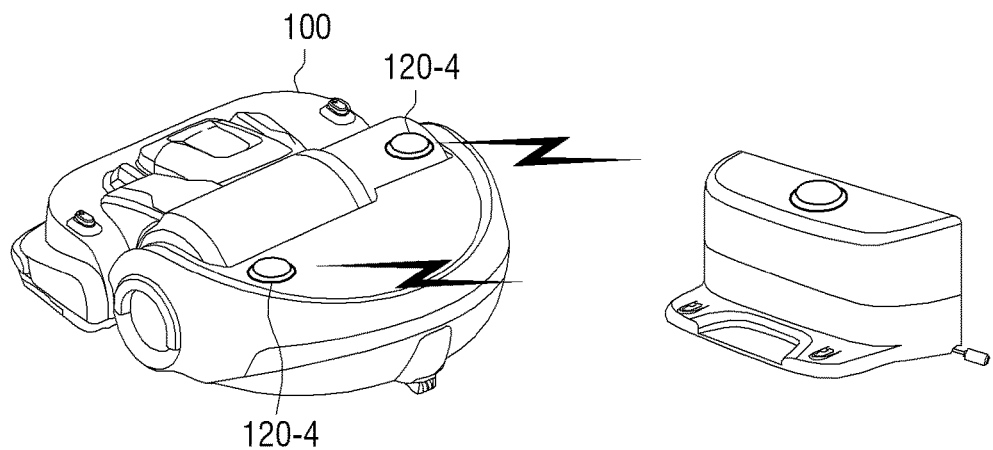
FIG. 8 illustrates a robot including an ultra-wideband (UWB) sensor and a charging station including a UWB tag, according to an exemplary embodiment.

According to an exemplary embodiment, the controller 130 may perform a location checking function and a user tracking and/or avoiding function by using the UWB sensor 120-4. The controller 130 may measure a location and a direction of a UWB tag by using a difference between times of flights measured from a plurality of UWB sensors 120-4 of the robot 100. For example, if a task is completed, the controller 130 may control the UWB sensor 120-4 to check a location of a charging station including a tag communicating with the UWB sensor 120-4 (FIG. 8). The controller 130 may also control the driver unit 110 to move into a checked location.

Even if a UWB tag moves, the UWB sensor 120-4 may track a location of the UWB tag. The controller 130 may control the driver unit 110 and the sensor unit 120 to track a user with the UWB tag or the like and perform a task by using the above-described characteristic. For example, if a child goes here and there while eating cookies, there is a high probability that cookie crumbs will be dropped on a moving path of the child. The controller 130 may control the driver unit 110, the sensor unit 120, and the dust collector 140 to attach a UWB tag onto the clothes of the child so as to track the child and perform a cleaning task.

On the contrary, the controller 130 may control the driver unit 110 to avoid a place where the UWB tag is located.

According to another exemplary embodiment, the robot 100 may include a plurality of UWB sensors 120-4 to detect a rotation, a direction, a height, etc. of a moving body by using time differences between signals respectively reaching the plurality of UWB sensors 120-4. For example, if two UWB sensors 120-4 are attached onto left and right sides of the robot 100, and signals are simultaneously received from UWB tags, the controller 130 may know that a direction of the robot 100 is a direction of a UWB tag.

Figure 9:
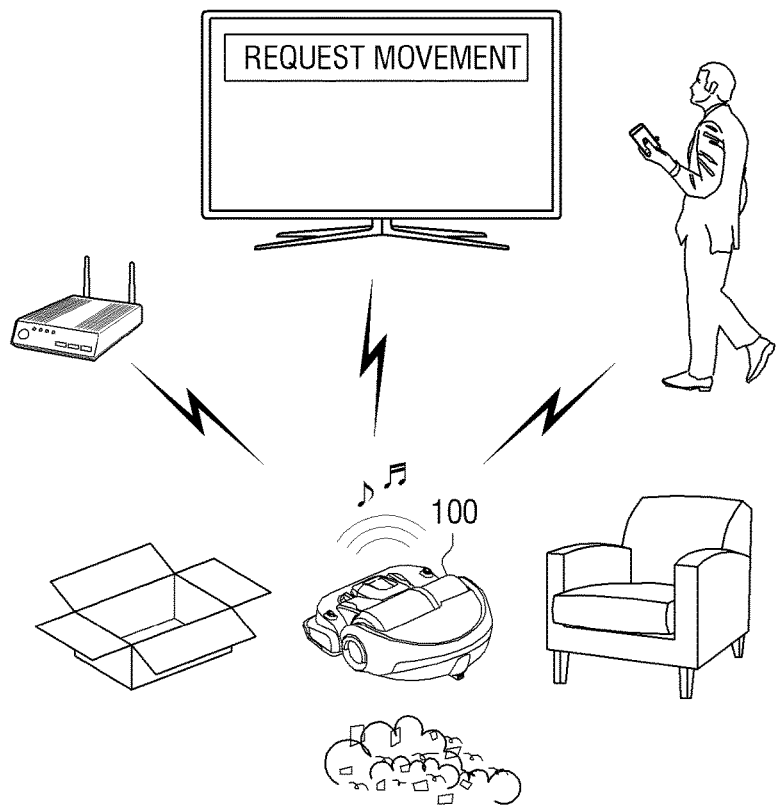
FIG. 9 illustrates an operation of a robot determining that a complexity level around the robot is high to request a forcible movement, according to an exemplary embodiment.

According to an exemplary embodiment, the controller 130 may measure a complexity level and determine whether the robot 100 is in a situation where the robot 100 requests a forcible movement from the user, based on the measured complexity level. For example, as shown in FIG. 9, if the robot 100 is moved into a preset area and then stuck in the preset area due to an occurrence of an obstacle or the like, the controller 130 may determine that a complexity level is high. In this case, the controller 130 may provide the user with a notification message to notify the user of a need for a forcible movement. The controller 130 may set a corresponding location to an inaccessible area.

As another example, if the robot 100 is to move to a space that is divided into a plurality of sections, and thus the robot 100 does not move from one section into another section, the controller 130 may transmit a notification message to the user. Examples of a case where an internal space is divided into a plurality of sections may include installing of a fence around a play space of a child to divide the play space into sections, installing of a fence to enable a pet so as not to access a particular living space, etc.

As another example, if the robot 100 does not return to an operable condition only through an operation of the driver unit 110 after there is an unexpected clash, the controller 130 may provide the user with a notification message.

The controller 130 may transmit a notification message to the user by using various methods. For example, the controller 130 may notify the user of a need for a forcible movement by using a voice signal or a visual signal. The controller 130 may control an audio output unit (not shown) to output a warning siren, music, a guide message, or the like. Alternatively, the controller 130 may control a lighting unit (not shown) to generate a visual signal such as repeated lighting of a light-emitting diode (LED) lamp.

As another example, the controller 130 may control the communicator 170 to transmit a control command displayed by a notification message to a mobile device, a wearable device, another electronic device located in an internal space where the robot 100 is located, a hub of a home network, a device providing an IoT function, or the like. The controller 130 may check a place where the user is located, through IoT or a home network. The controller 130 may also control the communicator 170 to transmit a control command displaying a notification message to an electronic device existing in a place where the user is located.

According to various exemplary embodiments as described above, the robot 100 may determine a current location by using a map of an area providing a service. The robot 100 may also provide a service appropriate for an intention of a user who forcibly moves the robot 100, by using location information, environment information, etc. that are changed.

A method of controlling the robot 100 according to various exemplary embodiments will now be described with reference to FIGS. 10 through 14.

Figure 10:
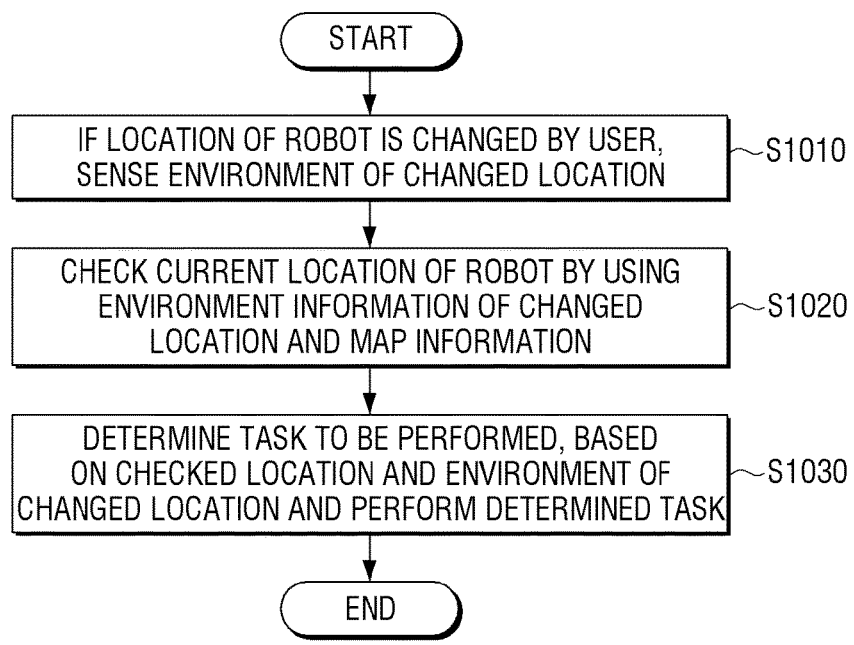
FIGS. 10 through 16 are flowcharts of methods of controlling a robot according to various exemplary embodiments.

FIG. 10 is a flowchart of a method of controlling the robot 100 according to an exemplary embodiment. The robot 100 may perform a task or may be in a standby state. If a user changes a location of the robot 100, the robot 100 may sense an environment of the changed location in operation S1010. For example, the user may pick the robot 100 up to move the robot 100 and move the location of the robot 100 by using a remote control device such as a remote controller or the like. In other words, if the robot 100 strays from a planned moving path in a task that is being performed, the robot 100 may determine this situation as a forcible movement made by the user. In operation S1020, the robot 100 may check a current location of the robot 100 by using environment information of the sensed changed location and pre-stored map information. The pre-stored map information may be global map information about a place where the robot 100 performs a task to provide a service. The pre-stored map information may also include a plurality of divided areas and task information set in each of the plurality of divided areas.

In operation S1030, the robot 100 determines a task, which is to be performed, based on the checked location and an environment of the changed location and performs the determined task. For example, the robot 100 may receive a list of tasks, which are to be performed in a section where the robot 100 is located, by using map information corresponding to the checked location. Also, the robot 100 may select the most appropriate task from tasks included in the list, by using environment information, time information, location information of the user, etc. sensed by various types of sensors. Therefore, the robot 100 may select and perform a task appropriate for an intention of the user who forcibly moves the robot 100.

Figure 11:
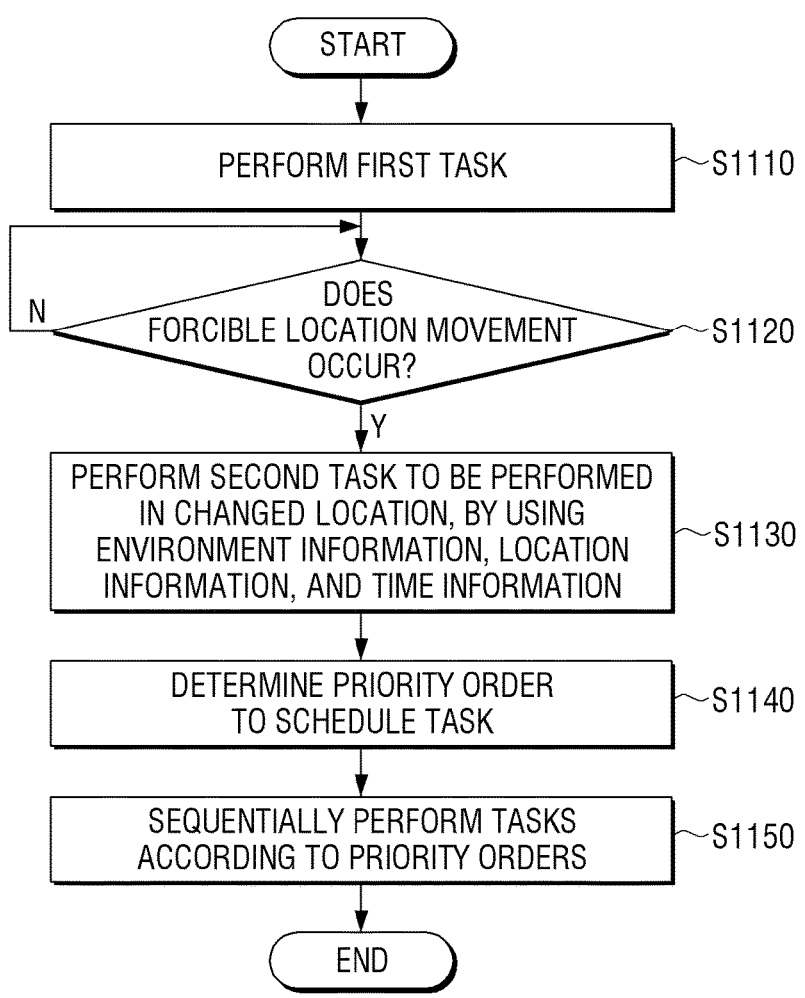

FIG. 11 is a flowchart of a method of controlling the robot 100 according to another exemplary embodiment. In operation S1110, the robot 100 may perform a first task according to a user command, a reserved schedule, or the like. In operation S1120, the robot 100 may determine whether a forcible location movement occurs when performing the first task. For example, the robot 100 may sense that the robot 100 is separated from a floor surface to determine that the forcible location movement occurs.

If it is determined in operation S1120 that the forcible location movement occurs, the robot 100 may determine a second task, which is to be performed in a changed location, by using environment information, location information, time information, etc. in operation S1130. For example, if the robot 100 is forcibly moved into a kitchen when performing a cleaning task after a dinner time, the robot 100 may synthesize location information (kitchen) of a changed location and time information (after dinner time) to determine a dish-washing task which is to be performed.

After determining the second task which is to be performed in the changed location, the robot 100 may determine a priority order with a first task that was being performed, in operation S1140. The robot 100 may determine a task schedule according to the determined priority order. For example, if it is determined that the second task to be performed in the changed location is to be first performed, the robot 100 may set a task schedule to perform the second task and then perform the first task. In operation S1150, the robot 100 may sequentially perform tasks according to determined priority orders.

Figure 12:
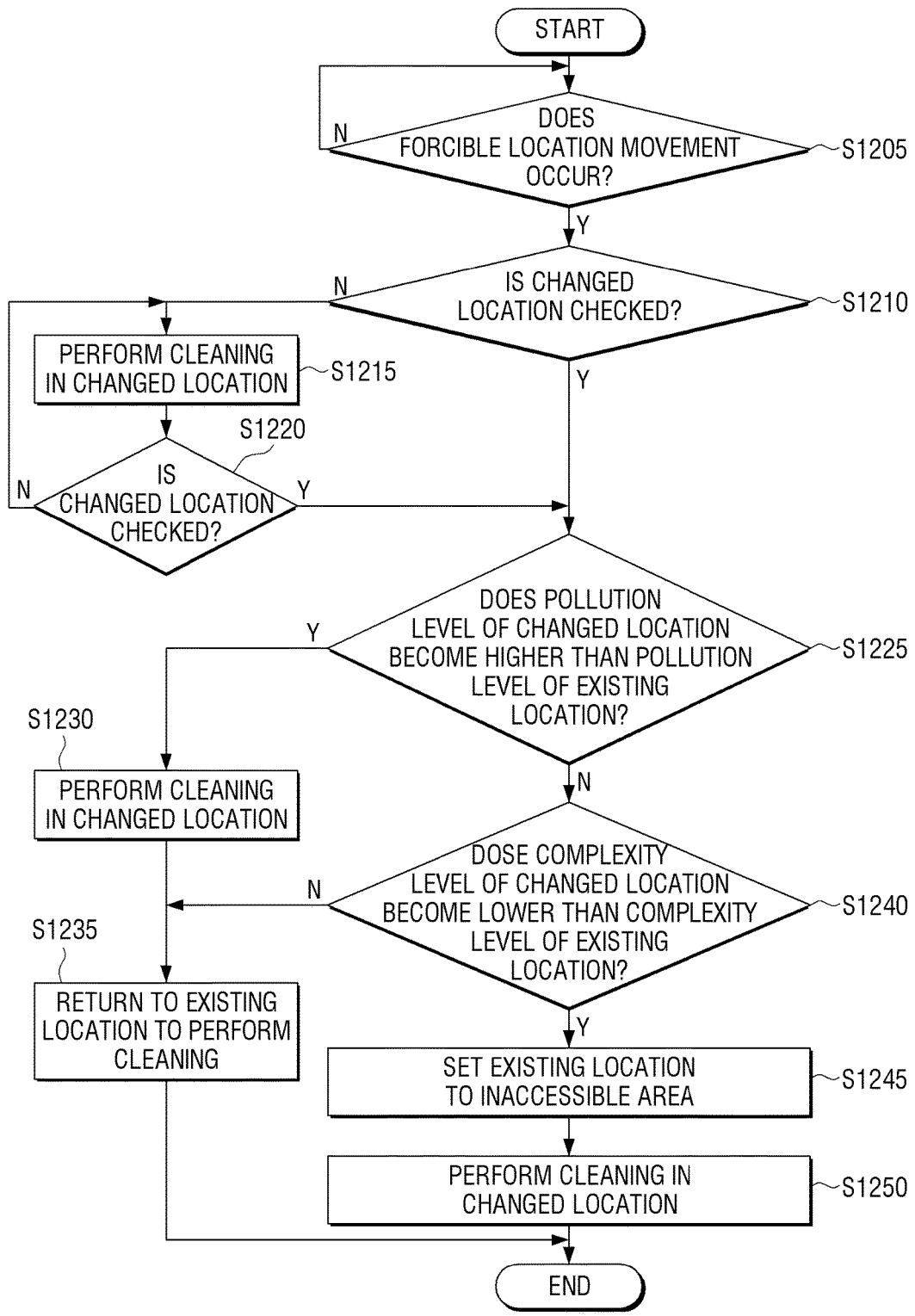

FIG. 12 is a flowchart of a method of controlling the robot 100 according to an exemplary embodiment. FIG. 12 illustrates a situation where the robot 100 mainly performs a cleaning task, according to an exemplary embodiment.

In operation S1205, the robot 100 may determine whether a forcible location movement occurs when performing a cleaning task. For example, if a contact between movement means such as wheels or the like and a floor surface is sensed to be released or a movement command of a user is received through a remote controller or the like, the robot 100 may determine that the forcible location movement occurs.

If it is determined in operation S1205 that the forcible location movement occurs, the robot 100 determines a changed location in operation S1210, i.e., check the changed location. For example, the robot 100 may determine a location into which the robot 100 is moved from all locations where the robot 100 operates, through map information including a global map, environment information sensed by using various types of sensors, etc.

If the changed location is not determined in operation S1210, the robot 100 first continuously performs the cleaning task in the changed location in operation S1215. In operation S1220, the robot 100 tries to continuously check the changed location when performing the cleaning task.

If the changed location is determined in operations S1210 and 1220, the robot 100 performs an operation of determining an intention of a user who moves the robot 100 into the changed location. The robot 100 may first sense a pollution level of the changed location by using a pollution level sensor. In operation S1225, the robot 100 may compare the pollution level of the changed location with a pollution level of an existing location. For example, the robot 100 may sense the pollution level by using a dust sensor, an image sensor, an odor sensor, or the like.

If the pollution level of the changed location becomes higher than the pollution level of the existing location in operation S1225, the robot 100 performs the cleaning task in the changed location in operation S1230. Since there is a high probability that the robot 100 will first clean an area having a high pollution level, the user has an intention of forcibly moving the robot 100 into a location having a higher pollution level. If cleaning of the changed location is completed, the robot 100 may return to the existing location to perform the cleansing task in operation S1235. Since a global map is used, the robot 100 may accurately check the existing location even in a situation where the robot 100 is forcibly moved. Therefore, the robot 100 may return to the existing location to continuously perform cleaning from a location where the cleansing task stops.

If the pollution level of the changed location is not higher than the pollution level of the existing location, the robot 100 may sense a complexity level in operation S1240. For example, if things are disposed around or outside of the robot 100, the complexity level is high. If no things are disposed around or outside the robot 100, the complexity level is low. The robot 100 may sense the complexity level by using the laser sensor 120-3, an infrared sensor (not shown), the image sensor 120-5, or the like.

If the complexity level of the changed location is not lower than a complexity level of the existing location in operation S1240, the robot 100 may return to the existing location to perform the cleaning task in operation S1235. If there are no differences in the pollution level and the complexity level, the user has no intention of setting an area which is to be first cleaned. However, there is a high probability that the user will move the robot 100 with another intention that the robot 100 disturbs a movement of the user.

If it is determined in operation S1240 that the complexity level of the changed location becomes lower than the complexity level of the existing location, the robot 100 may set the existing location to an inaccessible area in operation S1245. The operation of setting the inaccessible area may be omitted. In operation S1250, the robot 100 may perform the cleaning task in the changed location. Since there is a high probability that the user will move existing things to perform cleaning in the changed location, the complexity level becomes lower. Since there is a high probability that the existing things will be moved into the existing location where cleaning is completed, the robot 100 may set the inaccessible area in the existing location.

For example, the robot 100 may set the inaccessible area only when performing this time cleaning task. The robot 100 may determine that the inaccessible area is temporarily set and may not indicate the inaccessible area on a global map. However, the robot 100 may store a history of setting the inaccessible area. If the inaccessible area is temporarily set by the preset number of times or more in the same area for a preset period, the robot 100 may add or update information about the inaccessible area on the global map.

As another example, the robot 100 may immediately add or update information about a set inaccessible area on a global map. In this case, the robot 100 may not access an inaccessible area, which is set when performing this time cleaning task, even when performing next time cleaning task. Also, the robot 100 may add or update location information of the inaccessible area and information about a complexity level, a pollution level of the inaccessible area, etc. together on the global map.

Figure 13:
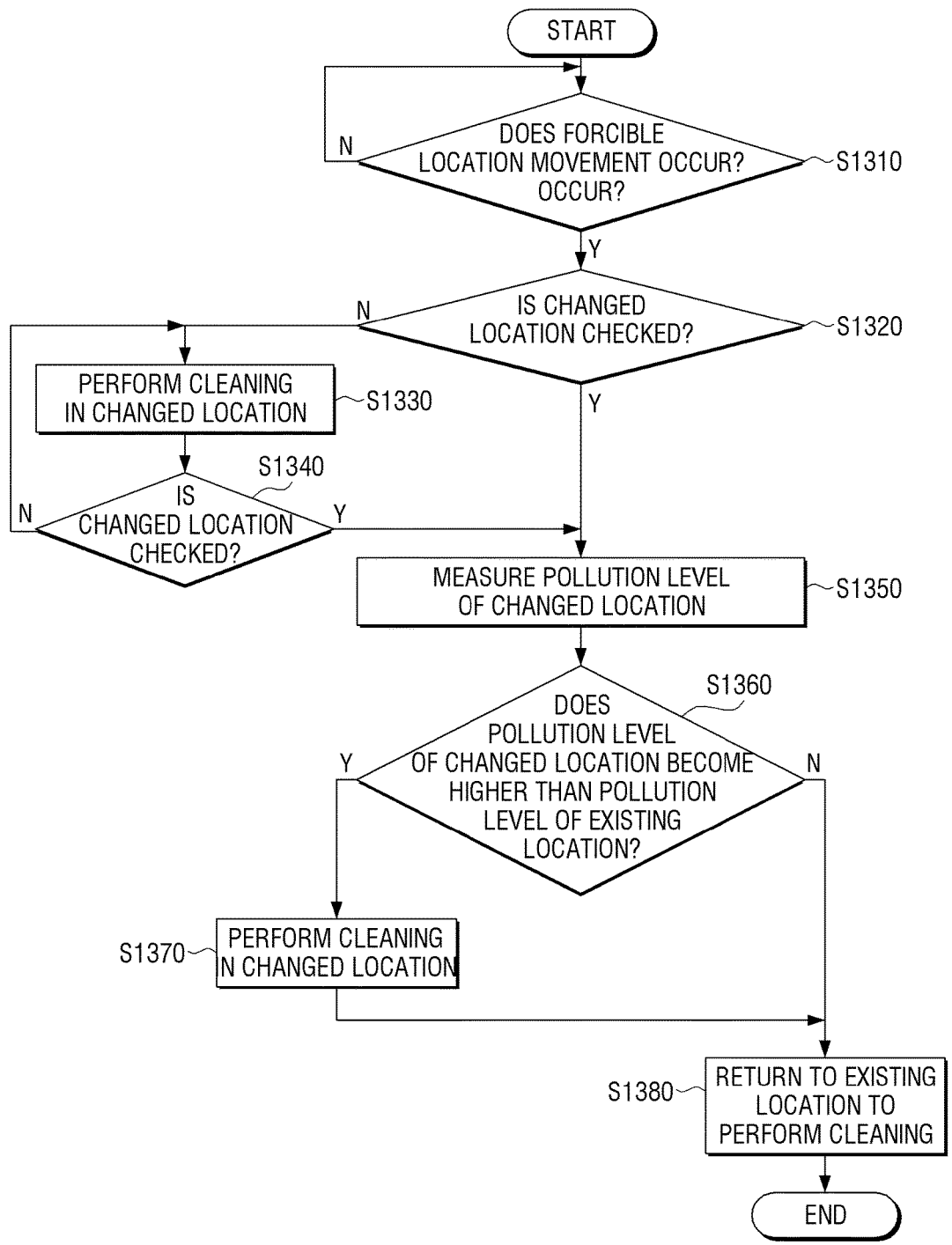

FIG. 13 is a flowchart of a method of controlling the robot 100 according to another exemplary embodiment. If a forcible location movement occurs when performing a cleaning task, the robot 100 may determine whether the cleaning task is first performed in a moved location or an existing location, through a determination of a pollution level.

In operation S1310, the robot 100 may determine whether the forcible location movement occurs when performing the cleaning task. For example, if a contact between movement means such as wheels or the like and a floor surface is sensed to be released or a movement command of a user is received through a remote controller or the like, the robot 100 may determine that the forcible location movement occurs.

If it is determined in operation S1310 that the forcible location movement occurs, the robot 100 determines a changed location. For example, the robot 100 may know the changed location and the existing location through map information including a global map, environment information sensed by using various types of sensors, etc.

If the changed location is not determined in operation S1320, the robot 100 continuously performs a cleaning task in the changed location in operation S1330. The robot 100 continuously tries to check the changed location even when performing the cleaning task in operation S11340.

If the changed location is determined in operations S1320 and 1340, the robot 100 may measure a pollution level of the changed level in operation S1350. The robot 100 may measure the pollution level by using various methods. For example, the robot 100 may measure the pollution level by using a dust concentration measured through the dust sensor 120-1. Alternatively, the robot 100 may measure the pollution level by using a reflectance of a floor surface on which the robot 100 is located. As another example, the robot 100 may sense air components of the floor surface and the changed location to measure the pollution level. In this case, the robot 100 may use the odor sensor 120-2, a gas detector sensor (not shown), or the like.

The robot 100 may vary a pollution measuring method by using information on a global map corresponding to the changed location. For example, if the changed location is determined as a kitchen, the robot 100 may measure the dust concentration of the floor surface and measure whether gas leaks, to determine the pollution level.

In operation S1360, the robot 100 may compare the pollution level of the changed location with a pollution level of the existing location. If the pollution level of the changed location becomes higher than the pollution level of the existing location in operation S1360, the robot 100 may perform the cleaning task in the changed location in operation S1370. If the robot 100 is forcibly moved into a location having a higher pollution level, there is a high probability that the user has an intention of performing cleaning from the location having the higher pollution level. Therefore, if the pollution level of the changed location is high, the robot 100 may perform the cleaning task from the changed location. If cleaning is completed in the changed location, the robot 100 may return to the existing location to perform the cleaning task in operation S1380. Since the robot 100 accurately knows the existing location and the changed location through the global map or the like, the robot 100 may return to the existing location even in a forcible movement situation to re-perform the cleaning task that stops.

On the contrary, if the pollution level of the changed location is not higher than the pollution level of the existing location, the robot 100 may return to the existing location to perform the cleaning task in operation S1380. Since there is a high probability that the user will move the robot 100 with an intention unrelated to the cleaning task, the forcible location movement occurs even if the pollution level of the changed location is not different from or is lower than the pollution level of the existing location.

Figure 14:
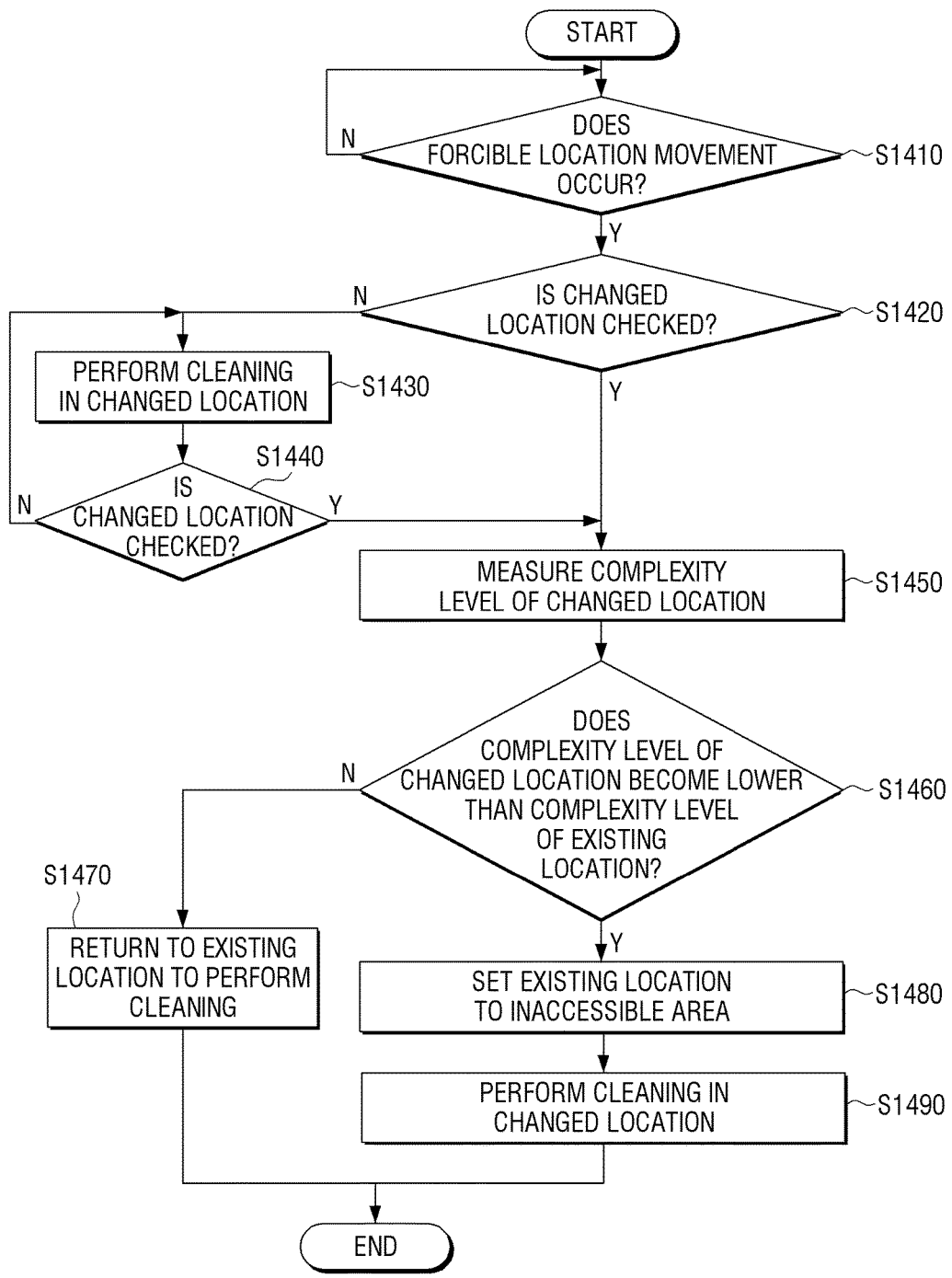

FIG. 14 is a flowchart of a method of controlling the robot 100 according to another exemplary embodiment. If the forcible location movement occurs when performing cleaning task, the robot 100 may determine whether the cleaning task is first performed in the changed location or the existing location, through a determination of a complexity level. The robot 100 may also determine whether to set the existing location to an inaccessible area, by using complexity level information.

In operation S1410, the robot 100 may determine whether a forcible location movement occurs when performing a cleaning task. For example, if a contact between movement means such as wheels or the like and a floor surface is sensed to be released or a movement command of a user is received through a remote controller or the like, the robot 100 may determine that the forcible location movement occurs.

If the forcible location movement occurs in operation S1410, the robot 100 determines a changed location. For example, the robot 100 may determine a location into which the robot 100 is moved from all locations where the robot 100 operates, through map information including a global map, environment information sensed by using various types of sensors, etc.

If the changed location is not determined in operation S1420, the robot 100 first continuously performs the cleaning task in the changed location in operation S1430. In operation S1440, the robot 100 continuously tries to check the changed location when performing the cleaning task.

If the changed location is determined in operations S1420 and S1440, the robot 100 may measure a complexity level of the changed location in operation S1450. The robot 100 may measure the complexity level by using various types of sensors. For example, the robot 100 may sense how many obstacles exist around or outside the robot 100, by using the laser sensor 120-3 that emits a laser beam around or outside the robot 100. The robot 100 may measure the complexity level by using the number of clashes sensed by the obstacle sensor 120-6. As another example, the robot 100 may operate along with another electronic device (e.g., a CCTV) disposed in an internal space to sense how many obstacles exist around or outside the robot 100.

In operation S1460, the robot 100 may compare the complexity level of the changed location with a complexity level of an existing location. If the complexity level of the changed locations do not become lower than the complexity level of the existing location in operation S1460, the robot 100 may return to the existing location to continuously perform cleaning in operation S1470. Since there is a high probability that the user will forcibly move the robot 100 by reason of disturbing a movement of the user not with an intention of designating a location where the cleaning task is to be first performed, there is no difference between the complexity level of the changed location and the complexity level of the existing location.

On the contrary, if it is determined in operation S1460 that the complexity level of the changed location becomes lower than the complexity level of the existing location, the robot 100 may set the existing location to an inaccessible area in operation S1480. In operation S1490, the robot 100 may perform cleaning in the changed location.

According to an exemplary embodiment, the robot 100 may add or update information (location information, complexity level information, etc.) about an inaccessible area on a global map not to access the inaccessible area when performing a next task.

Figure 15:
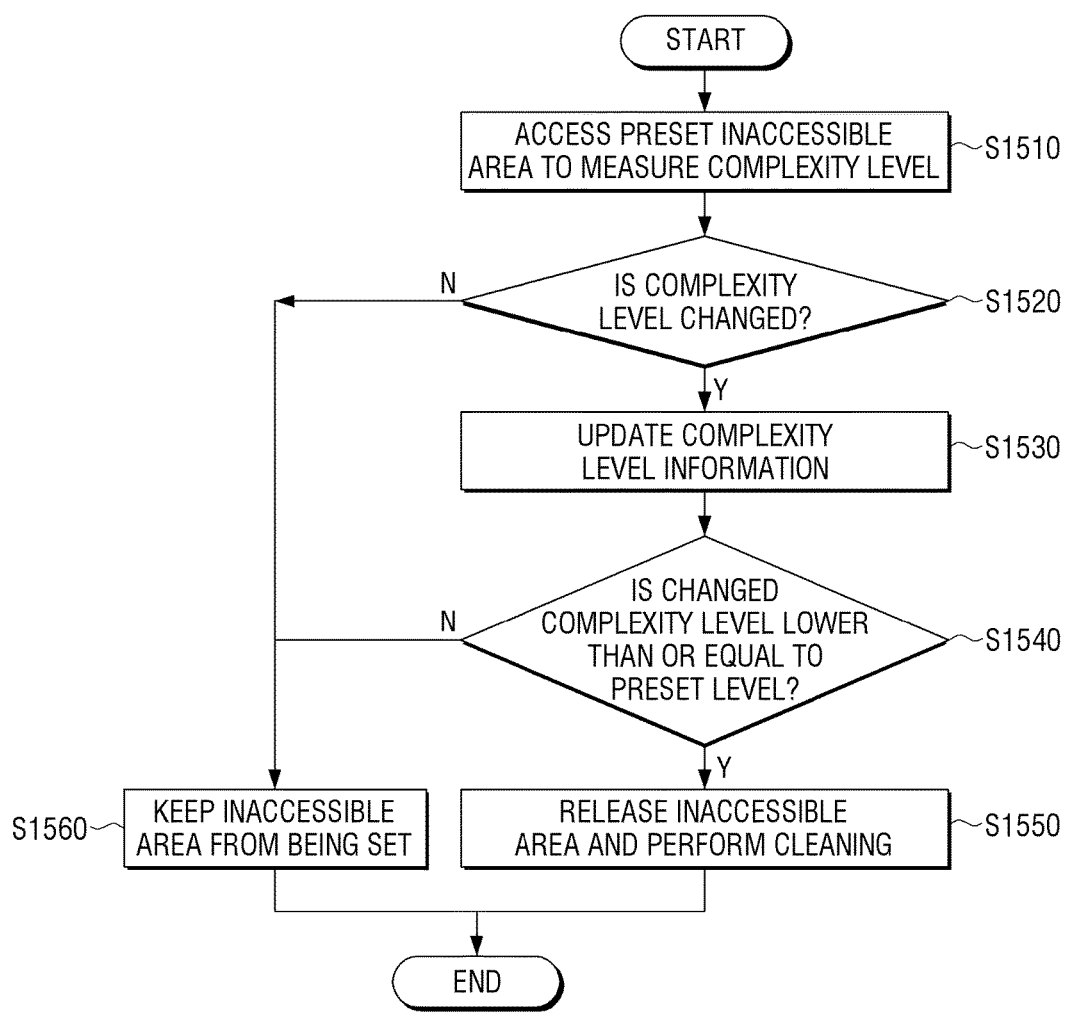

According to another exemplary embodiment, the robot 100 may determine whether a reason for setting an inaccessible area is solved when performing a next task. Referring to FIG. 15, the robot 100 may access a preset inaccessible area to measure a complexity level of the preset inaccessible area in operation S1510. In operation S1520, the robot 100 may compare the currently measured complexity level with a previously measured complexity level of the inaccessible area to determine whether there are changes in the complexity level.

If there are changes in the complexity level in operation S1520, the robot 100 may update complexity level information in operation S1530. Therefore, the robot 100 may update location information or the complexity level information of the inaccessible area as latest information on a global map.

In operation S1540, the robot 100 may compare the changed complexity level with a preset complexity level. Here, the preset complexity level may correspond to a minimum level for setting an inaccessible area. If the changed complexity level is lower than or equal to the preset complexity level in operation S1540, the robot 100 may release the inaccessible area from being set and perform cleaning in a corresponding area in operation S1550. The robot 100 may indicate the release of the setting of the inaccessible area on the global map.

On the contrary, if there is no change in a complexity level of the inaccessible area in operation S1520 or the complexity level of the inaccessible area exceeds the preset complexity level in spite of a change in the complexity level of the inaccessible area in operation S1540, the robot 100 may keep the inaccessible area from being set in operation S1560. In this case, the robot 100 may not enter into the inaccessible area but may move into another area to continuously perform cleaning.

Figure 16:
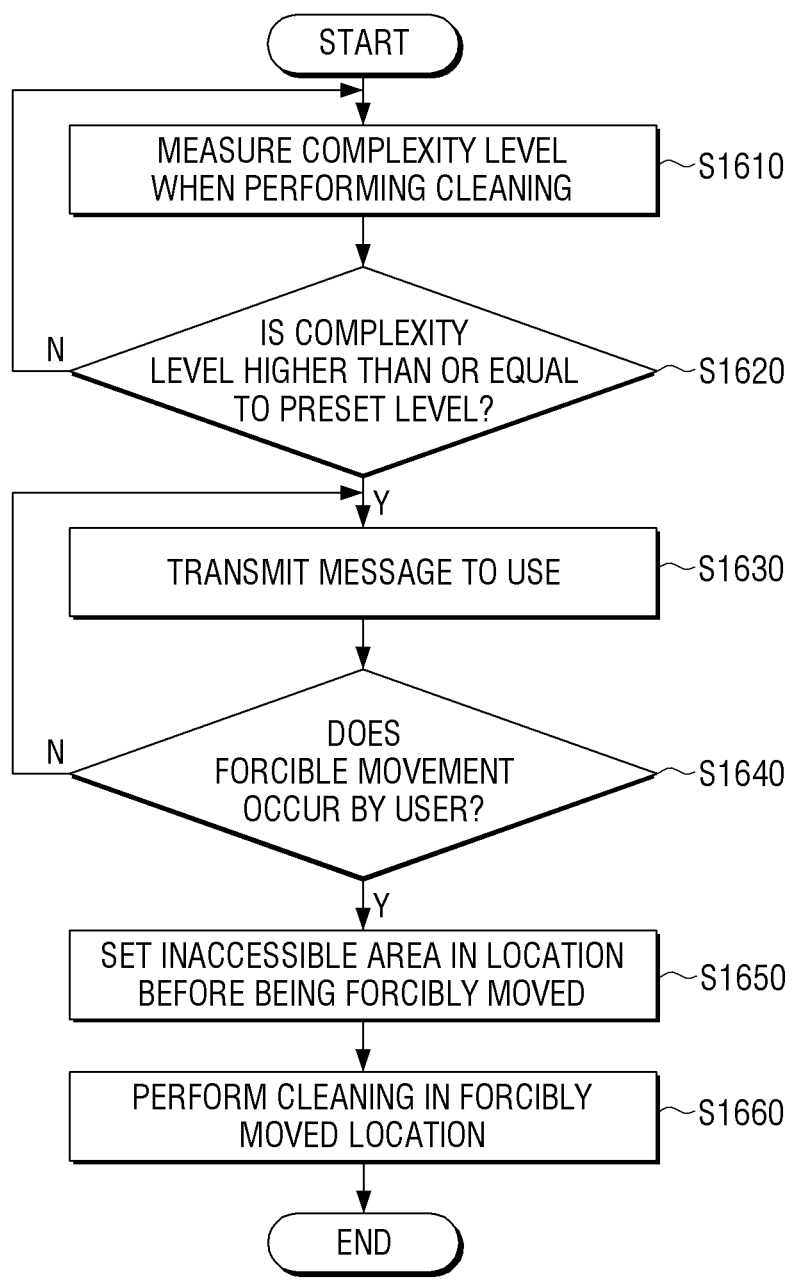

According to an exemplary embodiment, if it is determined that a forcible movement by a user is needed, through a measurement of a complexity level, the robot 100 may transmit a notification message to the user. Referring to FIG. 16, the robot 100 may measure a complexity level when performing cleaning in operation S1610. The robot 100 may perform cleaning and various types of tasks and simultaneously measure a complexity level around or outside the robot 100.

If the measured complexity level is higher than or equal to a preset level in operation S1620, the robot 100 may determine a situation where a forcible movement is requested from the user. For example, if the robot 100 is stuck in a preset area due to an occurrence of an obstacle or the like or the robot 100 may not return to an operable state due to an unexpected clash, the complexity level measured by the robot 100 may be higher than or equal to the preset level.

In this case, the robot 100 may transmit a notification message to the user by using various methods in operation S1630. For example, the robot 100 may generate a voice signal or a visual signal to transmit a message for notifying the user of a need for a forcible movement, to the user. As another example, the robot 100 may transmit a notification message to a mobile device, a wearable device, or the like of the user. As another example, the robot 100 may transmit a control command for displaying a notification message on a device providing an IoT function or a display apparatus (e.g., a TV, an electronic frame, or the like) connected through a home network. The robot 100 may also transmit a control command for generating a voice signal corresponding to a notification message to an audio device (e.g., a BLUETOOTH speaker or the like) that is communication-connected.

After transmitting the notification message, the robot 100 may determine whether the forcible movement by the user occurs in operation S1640. For example, the robot 100 may sense that a contact between movement means such as wheels or the like and a floor surface is released to determine whether the forcible movement occurs. As another example, the robot 100 may sense whether the contact between the movement means and the floor surface is released, by using an illumination sensor, a proximity sensor, or the like provided at a lower part of the robot 100.

If the forcible movement by the user occurs in operation S1640, the robot 100 may set a location of the robot 100 before being moved to an inaccessible area in operation S1650. The robot 100 may also add or update information about the setting of the inaccessible area on a global map. The robot 100 may continuously perform cleaning in the forcibly moved location in operation S1660.

As shown in FIG. 16, operation S1650 of setting the inaccessible area is performed after operation S1630 of transmitting the notification message to the user. However, operations S1630 and S1650 may be simultaneously performed or operation S1630 may be performed before operation S1650.

Methods described above may be embodied as program commands that may be performed through various types of computer units and then recorded on a non-transitory computer readable medium. The non-transitory computer readable medium may include a program command, a data file, a data structure, or combinations thereof. Program commands recorded on the non-transitory computer readable medium may be particularly designed and configured for the present invention or may be well-known to those skilled in the art to be used.

Examples of the non-transitory computer readable medium include magnetic media such as a hard disk, a floppy disk, and a magnetic tape, optical media such as a CD-ROM and a DVD, magneto-optical media such as a floptical disk, and a hardware device particularly configured to store and perform a program command like an ROM, an RAM, a flash memory, etc. Examples of the program commands include a machine language code that is made by a compiler and a high-level language code that may be executed by a computer by using an interpreter or the like. The hardware device may be configured to operate as one or more software modules so as to perform operations of the present invention or an opposite case is possible.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. A robot comprising:
a driver;
a sensor; and
a controller configured to:
control the driver to perform a first task corresponding to a first area in the first area;
identify whether the robot is moved from the first area to a second area based on a user input to override an execution of a current operation corresponding to the first task performed by the robot, the identifying whether the robot is moved being based on a change of an environment around the robot sensed by the sensor and map information stored in the robot;
in response to identifying that the robot is moved from the first area to the second area, identify a second task to be performed corresponding to a second area, based on the second area and an environment around the robot in the second area;
control the driver to stop performing the first task and perform the second task in the second area without initializing a progress of the first task uncompleted at a time when the robot is moved from the first area to the second area;
control the driver to return to the first area after completion of the second task in the second area; and
control the driver to continue performing the first task based on the progress of the first task at the time when the robot is moved from the first area to the second area.

2. The robot of claim 1, wherein the map information stores a plurality of divided areas and a corresponding plurality of pieces of task information, one of the plurality of pieces of task information being set in a corresponding one of the plurality of divided areas.

3. The robot of claim 1, wherein in response to the first area of the robot being changed by a user to the second area, the controller is further configured to determine a priority order between the second task and the first task and performs the first and the second tasks according to the determined priority order.

4. The robot of claim 1, wherein the controller is further configured to acquire a user location and time information and determine the task to be performed, additionally based on the acquired user location and time information.

5. The robot of claim 1, further comprising:
a dust collector configured to suck in dust from a bottom of the robot,
wherein the sensor comprises a dust sensor configured to sense a dust concentration outside the robot.

6. The robot of claim 5, wherein the controller is further configured to compare the dust concentration sensed by the dust sensor at the second area with a dust concentration of the first area to determine an area where cleaning is to be performed and control the dust collector and the driver to perform a cleaning task corresponding to the determined area.

7. The robot of claim 6, wherein the controller is further configured to determine a complexity level of the second area and compare the determined complexity level with a complexity level of the first area to determine an area where cleaning is to be performed.

8. The robot of claim 7, wherein the controller is configured to add information about the determined complexity level on the map information.

9. The robot of claim 7, wherein the controller is further configured to determine if the robot is forcibly moved from the first area to the second area by the user while the robot is performing the first task at the first area before completion of the first task.

10. The robot of claim 7, wherein the controller is further configured to retrieve the map information from a storage, the map information being prestored in the storage before the environment of the second area is sensed by the sensor.

11. The robot of claim 5, wherein the sensor further comprises an odor sensor configured to sense an odor,
wherein the controller is further configured to search for an area corresponding to a source of the odor sensed by the odor sensor and sets an area corresponding to the searched for area as an inaccessible area.

12. The robot of claim 1, wherein the sensor senses an environment outside the robot by using an ultra-wideband (UWB) sensor.

13. The robot of claim 12, wherein in response to a task being completed, the controller is further configured to control the sensor to check a arca an area of a charging station comprising a tag, the tag performing communication with the UWB sensor, and control the driver to move to the checked area.

14. The robot of claim 1, wherein the user input is a user picking up the robot to move the robot from the first area to the second area.

15. The robot of claim 1, wherein the user input is a user moving the robot from the first area to the second area through a remote controller.

16. The robot of claim 1, wherein the current operation is a current movement of the robot corresponding to the first task performed by the robot.

17. The robot of claim 1, wherein the user input is received while the robot is performing the first task in the first area before completion of the first task.

18. A method of controlling a robot, the method comprising:
performing, through a driver of the robot, a first task corresponding to a first area in the first area;
identifying whether the robot is moved from the first area to a second area based on a user input to override an execution of a current operation corresponding to the first task performed by the robot, the identifying whether the robot is moved being based on a change of an environment around the robot sensed by a sensor of the robot and map information stored in the robot;
in response to identifying that the robot is moved from the first area to the second area, identifying a second task to be performed corresponding to the second area, based on the second area and an environment around the robot in the second area;
stopping the performance of the first task and performing, through the driver, the second task in the second area without initializing a progress of the first task uncompleted at a time when the robot is moved from the first area to the second area;
returning to the first area after completion of the second task in the second area; and
continuing performing the first task based on the progress of the first task at the time when the robot is moved from the first area to the second area.

19. The method of claim 18, wherein the map information stores a plurality of divided areas and a corresponding plurality of pieces task information, one of the plurality of pieces of task information being set in a corresponding one of the plurality of divided areas.

20. The method of claim 18, wherein the identifying and performing of the second task to be performed comprises: in response to the first area of the robot being changed by a user to the second area, determining a priority order between the second task and the first task,
wherein the first and the second tasks are performed according to the determined priority order.

21. The method of claim 18, wherein the identifying and performing of the second task to be performed further comprises acquiring a user location and time information, and
wherein the second task to be performed is determined additionally based on the acquired user location and time information.

22. The method of claim 18, wherein the identifying and performing of the second task comprises:
sensing a dust concentration outside the robot at the second area;
comparing the sensed dust concentration at the second area with a dust concentration of the first area to determine an area where cleaning is to be performed; and
performing a cleaning task corresponding to the determined area.

23. The method of claim 18, wherein the identifying and performing of the second task comprises:
determining a complexity level of the second area;
comparing the determined complexity level with a complexity level of the first area to determine an area where cleaning is to be performed; and
performing a cleaning task corresponding to the determined area.

24. The method of claim 23, further comprising:
adding information about the determined complexity level on the map information.

25. The method of claim 18, further comprising:
in response to an odor being sensed, searching for an area corresponding to a source of the sensed odor; and
setting an area corresponding to the searched for area as an inaccessible area.

26. The method of claim 18, wherein the user input is a user picking up the robot to move the robot from the first area to the second area.

27. The method of claim 18, wherein the user input is a user moving the robot from the first area to the second area through a remote controller.

28. The method of claim 18, wherein the current operation is a current movement of the robot corresponding to the first task performed by the robot.

29. An apparatus for cleaning, the apparatus comprising:
a driver;
a vacuum cleaner;
a sensor configured to detect an environmental condition outside the apparatus; and
a controller configured to:
control the driver to move the apparatus, the vacuum cleaner, and the sensor,
operate the vacuum cleaner in a first area to perform a first pre-defined task corresponding to the first area;
identify whether the apparatus is moved from the first area to a second area based on a user input to override an execution of a current operation corresponding to the first pre-defined task performed by the apparatus, the identifying whether the apparatus is moved being based on a change of an environment around the apparatus sensed by the sensor and map information stored in the apparatus;
in response to identifying that the apparatus is moved from the first area to the second area, identify a second pre-defined task to be performed corresponding to the second area, based on the second area and an environment around the apparatus in the second area;
operate the vacuum cleaner in the second area to stop performing the first pre-defined task and perform the second pre-defined task in the second area without initializing a progress of the first pre-defined task uncompleted at a time when the robot is moved from the first area to the second area;
control the driver to return to the first area after completion of the second task in the second area; and
control the driver to continue performing the first task based on the progress of the first task at the time when the apparatus is moved from the first area to the second area.

30. The apparatus of claim 29, wherein the user input is a user picking up the apparatus to move the apparatus from the first area to the second area.

31. The apparatus of claim 29, wherein the user input is a user moving the apparatus from the first area to the second area through a remote controller.

32. The apparatus of claim 29, wherein the current operation is a current movement of the apparatus corresponding to the first task performed by the apparatus.

* * * * *